United States Patent [19]

Bernstein et al.

[11] Patent Number: 5,761,071
[45] Date of Patent: Jun. 2, 1998

[54] BROWSER KIOSK SYSTEM

[75] Inventors: Jason D. Bernstein, North Branford; Alexander D. Richardson, Old Lyme; Paul W. Blodgett, Haddam; Joseph P. McGuire, Orange, all of Conn.

[73] Assignee: Lexitech, Inc., Branford, Conn.

[21] Appl. No.: 706,988

[22] Filed: Jul. 27, 1996

[51] Int. Cl.⁶ ............................ G06F 17/00; G06G 7/48
[52] U.S. Cl. ........................ 364/479.07; 364/479.03; 364/479.08
[58] Field of Search ............................ 364/408, 479.07, 364/479.06, 478.03, 479.08; 235/379, 380, 381; 395/100, 155, 146, 147, 156, 157, 163, 173, 160, 154

[56] References Cited

U.S. PATENT DOCUMENTS

| | | | |
|---|---|---|---|
| 4,970,655 | 11/1990 | Winn et al. | 364/479 |
| 4,999,763 | 3/1991 | Ousborne | 364/140 |
| 5,088,586 | 2/1992 | Isobe et al. | 194/205 |
| 5,091,713 | 2/1992 | Horne et al. | 340/541 |
| 5,113,351 | 5/1992 | Bostic | 364/479 |
| 5,192,854 | 3/1993 | Counts | 235/375 |
| 5,243,174 | 9/1993 | Veeneman et al. | 235/381 |
| 5,349,658 | 9/1994 | O'Rourke et al. | 395/700 |
| 5,396,443 | 3/1995 | Messe et al. | 364/407 |
| 5,440,479 | 8/1995 | Hutton | 364/401 |
| 5,442,567 | 8/1995 | Small | 364/479 |
| 5,457,636 | 10/1995 | Sansone et al. | 364/478 |
| 5,524,201 | 6/1996 | Shwarts et al. | 395/161 |
| 5,533,123 | 7/1996 | Force et al. | 380/4 |
| 5,533,727 | 7/1996 | DeMar | 463/23 |
| 5,534,857 | 7/1996 | Laing et al. | 340/825.34 |
| 5,537,315 | 7/1996 | Mitcham | 364/408 |
| 5,550,976 | 8/1996 | Henderson et al. | 395/200.06 |
| 5,551,030 | 8/1996 | Linden et al. | 395/600 |
| 5,555,408 | 9/1996 | Fujisawa et al. | 395/600 |
| 5,557,730 | 9/1996 | Frid-Nielsen | 395/159 |
| 5,559,728 | 9/1996 | Kowalaski et al. | 364/571.02 |
| 5,564,048 | 10/1996 | Eick et al. | 395/600 |
| 5,572,643 | 11/1996 | Judson | 395/793 |
| 5,572,984 | 11/1996 | Aiden et al. | 126/299 R |
| 5,615,346 | 3/1997 | Gerken | 395/341 |

FOREIGN PATENT DOCUMENTS

| | | |
|---|---|---|
| 0731580 A1 | 11/1996 | European Pat. Off. |
| 96/36163 | 11/1996 | WIPO |

*Primary Examiner*—Reba I. Elmore
*Assistant Examiner*—Ramesh Patel
*Attorney, Agent, or Firm*—St. Onge Steward Johnston & Reens LLC

[57] ABSTRACT

A self-service kiosk system is provided which includes a monitor having a display screen, a microprocessor electrically coupled to the monitor for controlling the display screen, a browser software executable on the microprocessor for accessing and displaying documents in response to user input, the graphical user interface (GUI) of the browser software including controls for the browser software and a document viewing area, and at least one image positioned for display on the screen so as to mask the controls for the browser software, the image thus rendering the controls inaccessible to a user of the kiosk system to resist tampering with the browser software. The self-service kiosk system may also include a security control software which is programmed to disable system functions available to the user of the kiosk system to resist tampering with operation of the kiosk system.

22 Claims, 6 Drawing Sheets

BROWSER KIOSK SYSTEM

FIELD OF THE INVENTION

The invention relates to self service browser and more specifically, to a graphical user interface of a browser software to provide a user-friendly, tamper-resistant kiosk environment.

BACKGROUND OF THE INVENTION

A kiosk is essentially a self-service system, i.e., a computer system placed inside a box as illustrated in FIG. I or a desktop computer system for use in providing information and/or performing transactions (e.g., dispensing money as done by automated teller machines). A kiosk often employs a touch screen as the input device since touch screens are easy to use and immediately intuitive for almost all users; however, other types of pointing devices such as a mouse may also be used. With the advancements achieved by technology in recent years, the use of kiosks has become an economical and efficient alternative to the traditional form of providing interactive information and performing transactions; i.e., human-to-human interaction. Furthermore, kiosks are very effective in marketing and selling services and products since they may be programmed to provide information utilizing all of the resources available on multimedia; e.g., still graphics, sound, animations and full-motion video. This is why more and more government agencies and private business concerns are installing kiosks to better run and better market themselves. It has been estimated that by 1998, the number of kiosks installed in the United States will reach approximately 500,000 units.

Graphical browsers are application programs which access and display many different types of electronic information, such as a text file, a graphics file, a sound file, a video file and a database item, to name a few. Accessing a file or a document using a browser can be as simple as clicking a hyperlink (e.g., a highlighted word showing on a computer monitor screen) using a button on a mouse. A hyperlink, or simply link, is a way to "jump" from one document to another to which the link is connected.

Every hyperlink contains a hidden uniform resource locator (URL) which specifies to a browser where the document can be found. For example, for the assignee of the present invention, Lexitech, Inc., the URL where information about the present invention can be found is: http://www.lexitech.com/netkey. The "http://" portion of the URL refers to the protocol (hypertext transport protocol) to be used in accessing the document. The "www.lexitech.com/" portion specifies the name of the particular computer on the Internet to be accessed. And the "netkey" portion specifies the directory of that particular computer. Note that an IP address, which is a unique numerical address, is required of every computer directly connected to the Internet (e.g., the computer corresponding to the name www.lexitech.com has an IP address).

The graphical user interface (GUI) of a browser, such as Netscape Navigator, is designed to conform to prevailing GUI standards so that a user does not have to learn a new set of rules to use the browser. This means that the GUI of a browser running on Microsoft Windows, Macintosh, or X Window (UNIX) platforms employs pull-down menus, scroll bars, buttons and icons. FIG. 2 shows the prior art GUI for Netscape Navigator, which includes a menu bar 2, optional tool bar 4, program icon 6, document title area 8, optional document URL identification area 10, optional directory buttons 11, status bar 12, document viewing area 14 and optional scroll bar 16.

For a kiosk system which is utilized by numerous users, providing access to the world wide web (the web) and/or any other location having browser-displayable documents via the existing GUIs of the various browsers is not desirable for the following reasons. First, the menu bar, the document title area, etc. not only detract from the appearance of the GUI, but the number of menu choices provided by existing browsers is unwieldy and unnecessary in a kiosk environment where a user is primarily interested in quickly obtaining pertinent information (as an example, Netscape Navigator 2.01 offers 66 menu choices). This is especially the case since many kiosks provide information via touch screens, where a simplified user-friendly interface with a select number of essential buttons is desired.

Second, the menu bar has menu choices which permit a user to alter the settings of the browser (e.g., Microsoft's Internet Explorer has a menu choice *Security* which permits the user to set the security settings), or to disable it. In a kiosk system where uniformity and predictability of use is essential to achieving self-service, having menu choices which permit modification of the desired settings and program disability pose significant problems.

Third, a user can access and display any document accessible to the graphical browser, including documents which do not further the goal of the government agency or the business which has established the kiosk to provide interactive information pertaining to the government agency or the business.

And fourth, a user may perform a system function which is not desired by the kiosk provider. For example, a user of the browser running on Microsoft Windows platform may press Ctrl-Alt-Del keys to restart or crash the system. Unless prevented, the system may cease to function as a self-service kiosk device.

It would, therefore, be desirable to provide tamper-resistant, browser software which provides a visually pleasing, user-friendly, graphical user interface suitable for use in a self-service kiosk.

SUMMARY OF THE INVENTION

Accordingly, it is an object of the invention to provide a self-service computer having a display screen which can access and display documents using browser software, and including software for modifying the graphical user interface (GUI) of the browser software by including at least one image which masks controls for the browser software.

Another object of the invention is to provide the self-service computer where the image which masks the controls for the browser software includes buttons responsive to selection via the display screen for initiating browser software commands.

A further object of the invention is to provide the self-service computer where the image along with additional images cover all but the document viewing area of the GUI of the browser software.

Yet another object of the invention is to provide the self-service computer where the images are generated by a GUI control software.

Still another object of the invention is to provide the self-service computer where a security control software is programmed to limit documents accessible to the browser software.

Another object of the invention is to provide the self-service computer having software for remotely updating the browser, GUI control software and security control software.

A further object of the invention is to provide the self-service computer where the browser software has access to the world wide web.

These and other objects are achieved by a self-service computer which includes a monitor having a display screen, a microprocessor electrically coupled to the monitor for controlling what is displayed on the screen, browser software executable on the microprocessor for accessing and displaying documents on the screen in response to user input, the GUI of the browser software including controls for the browser software and a document viewing area, and at least one image positioned for display on the screen so as to mask the controls for the browser software, the image thus rendering the controls inaccessible to a user of the self-service computer to resist tampering with the browser software.

The self-service computer can also include a security control software which is programmed to disable operating system functions available to the user of the self-service computer to resist tampering with operation of the self-service computer. Furthermore, the security control software can limit documents accessible to the browser software by limiting uniform resource locators (URLs) accessible to the browser software.

The browser software, the image and the security control software can be remotely updated in a network setting.

The invention and its particular features and advantages will become more apparent from the following detailed description considered with reference to the accompanying drawings.

DETAILED DESCRIPTION OF THE INVENTION

The present invention will be described with Netscape Navigator as the browser of choice and Windows 95 as the operating system. As described in the Background of the Invention above, however, these selections are exemplary only. The present invention can be modified in a manner known to those in the art to accommodate any other browser and any other operating system. Indeed the browser and browser security software (to be discussed hereinbelow) may be combined as a single product.

Figure 1:
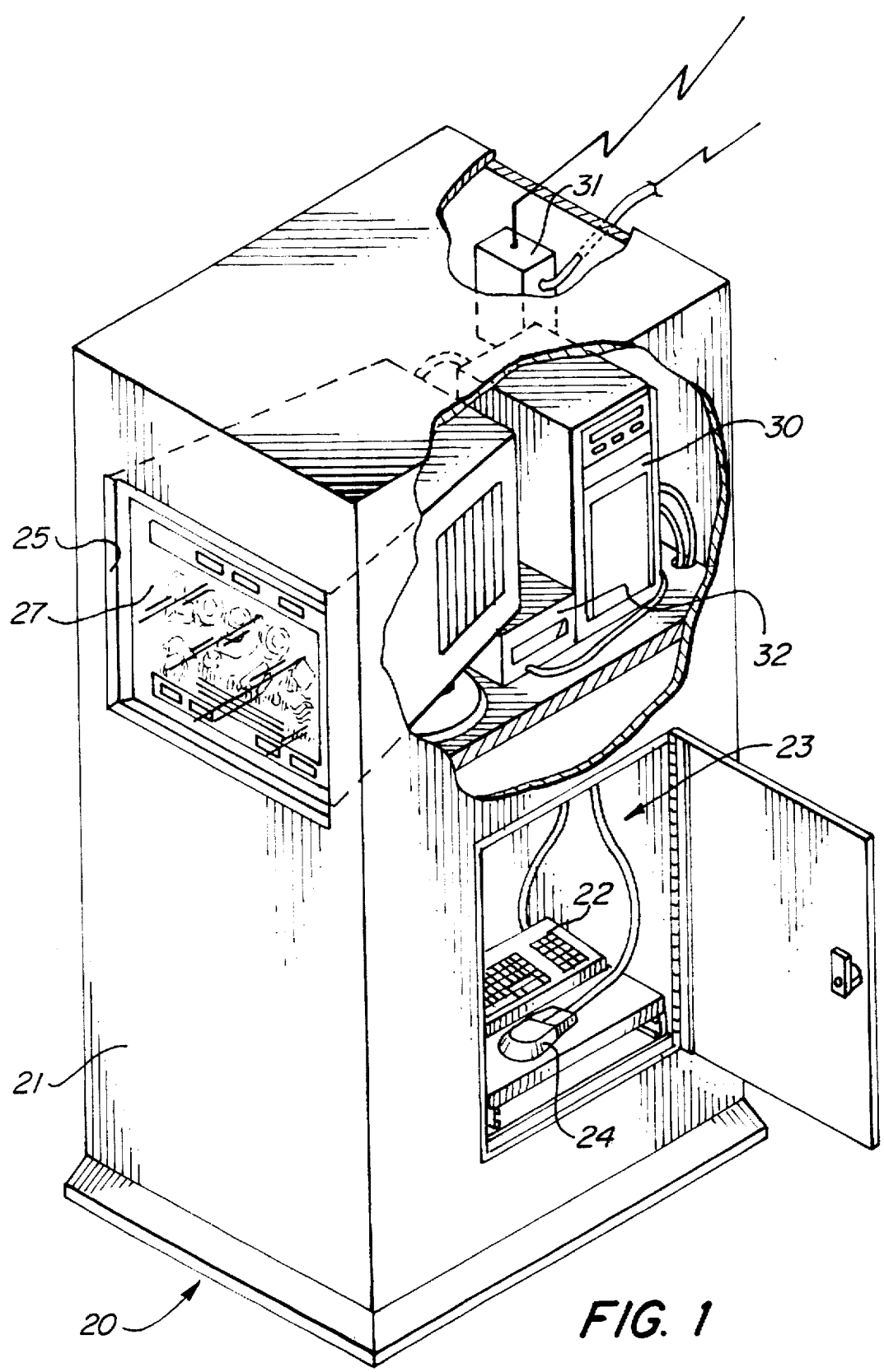
FIG. 1 shows a kiosk system of the present invention.

FIG. 1 shows one example of a kiosk system 20 of the present invention comprising a casing 21 with a storage compartment 23 which is normally inaccessible to users of the kiosk system 20 by means of a padlock or some other locking device (not shown). It is understood that a kiosk in accordance with the invention could also be provided as a desktop computer or some other self-service system. The storage compartment 23 stores a keyboard 22 and a mouse 24 which are used by the kiosk system 20 provider/operator to set the system settings.

The kiosk system 20 further comprises a monitor 25 having a display screen 27, a microprocessor 30 electrically coupled to the monitor 25 and memory 32. Memory 32, which may include RAM, ROM, fixed disk and/or other types of data storage, stores various programs for execution by the microprocessor 30, including browser software and an operating system. Note that the microprocessor 30 includes a telecommunication link and associated hardware, such as a modem, router or a network adapter 31. Telecommunication link may also be provided in a wireless manner; e.g., using an antenna and a cellular phone. Other hardware components of the kiosk system 20 which make it operational are not shown in FIG. 1 since they are known in the art.

As shown in FIG. 1, the display screen 27 of the kiosk system 20 of the present invention is illustrated as a touch screen; however, it is understood that any user input or pointing device (e.g. mouse) will suffice, especially where kiosk 20 is a desktop computer not mounted within casing 21. After the keyboard 22 and the mouse 24 have been used by the kiosk system 20 provider/operator to set the system settings, they are locked in the storage compartment 23 so that users of the kiosk system 20 cannot use the keyboard 22 and the mouse 24 to tamper with the system settings. In desktop computer kiosk systems where the keyboard 22 and the mouse 24 are accessible to users, security control software discussed below is utilized to render the browser software tamper-resistant for reliable self-service. Even without the keyboard 22 and the mouse 24, users can interact with the kiosk system 20 by touching appropriate selections showing on the touch screen. Furthermore, it is also possible to provide the keyboard 22 and/or the mouse 24 along with the touch screen. These different possibilities will be described in more detail hereinbelow.

Figure 2:
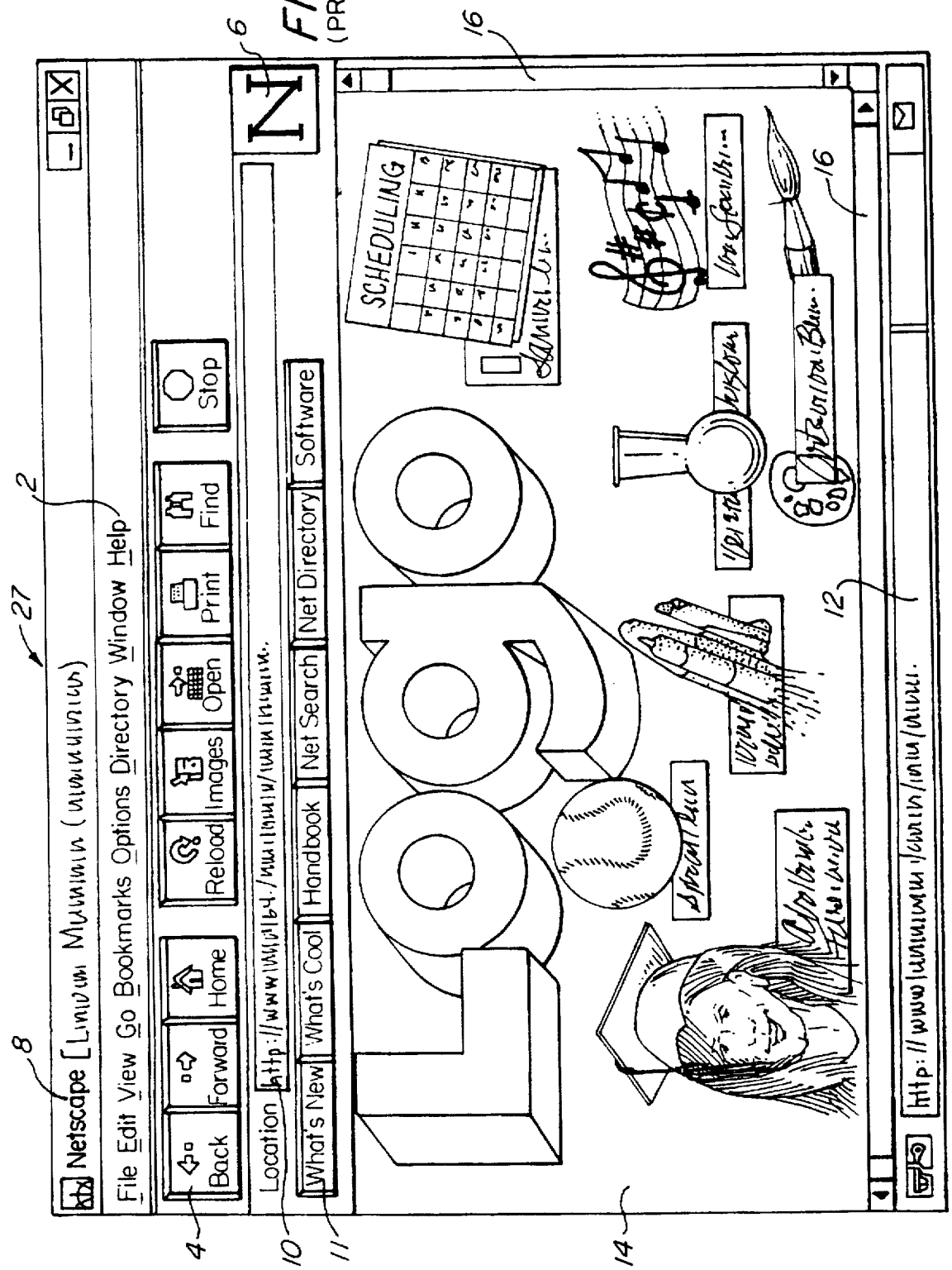
FIG. 2 shows the prior art graphical user interface (GUI) for Netscape Navigator, including a menu bar, tool bar, program icon, document title area, document uniform resource locator (URL) area, directory buttons, status bar, document viewing area and scroll bar.
Figure 3:
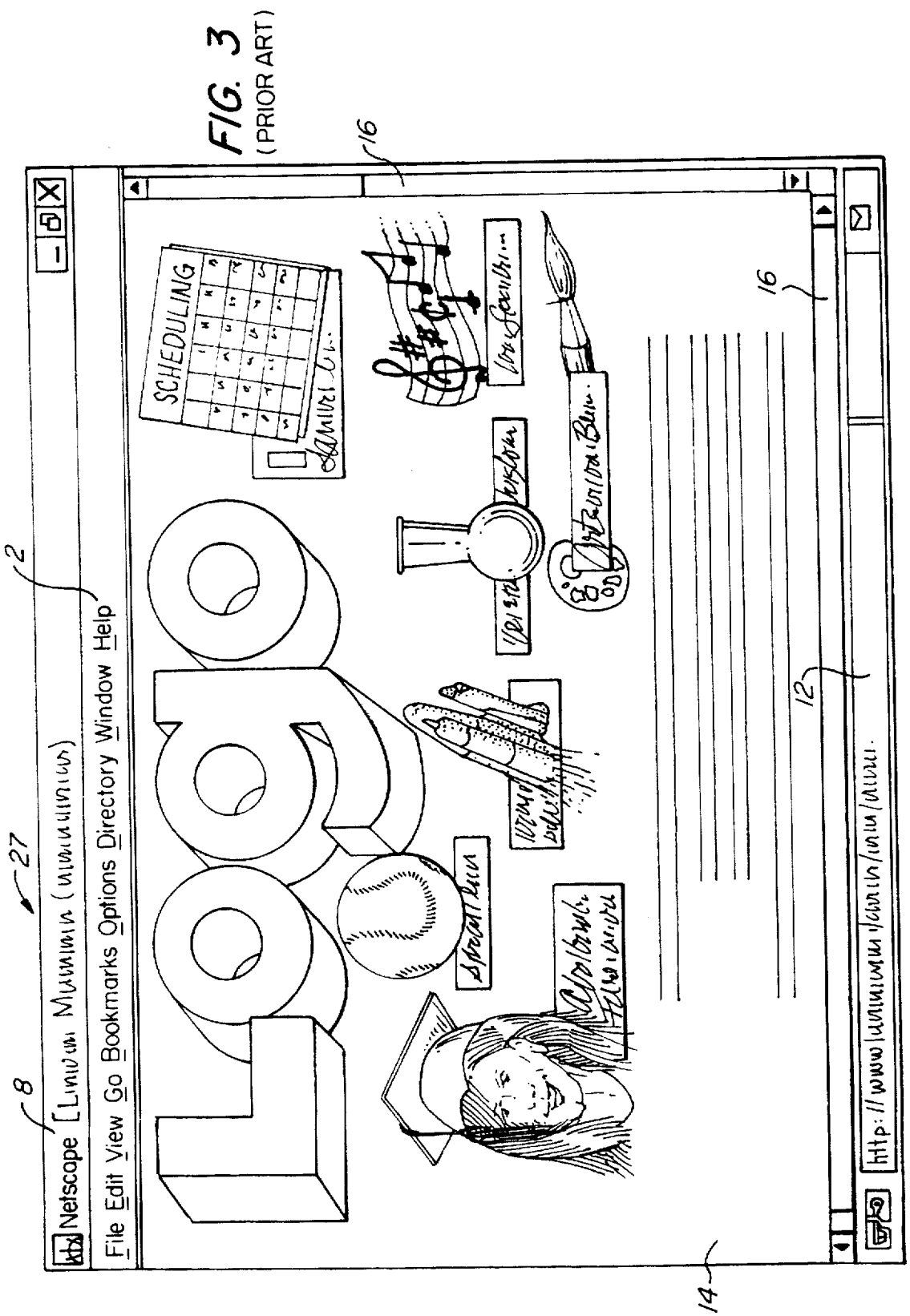
FIG. 3 shows the prior art GUI for Netscape Navigator of FIG. 2 displaying only the non-optional portions thereof: menu bar, document title area, status bar, document viewing area and scroll bar.

FIG. 3 shows the prior art GUI for Netscape Navigator of FIG. 2, but displaying only the menu bar 2, document title area 8, status bar 12, document viewing area 14 and scroll bar 16. Under the Options pull-down menu, Netscape Navigator (in this case, the version used is 2.01) permits a user to hide from display the tool bar 4, program icon 6, document URL identification area 10 and directory buttons 11. Other browsers also permit the user to customize the GUI so that selective portions of the GUI can be hidden (e.g., Microsoft's Internet Explorer permits customization of the GUI under the View pull-down menu).

Figure 4:
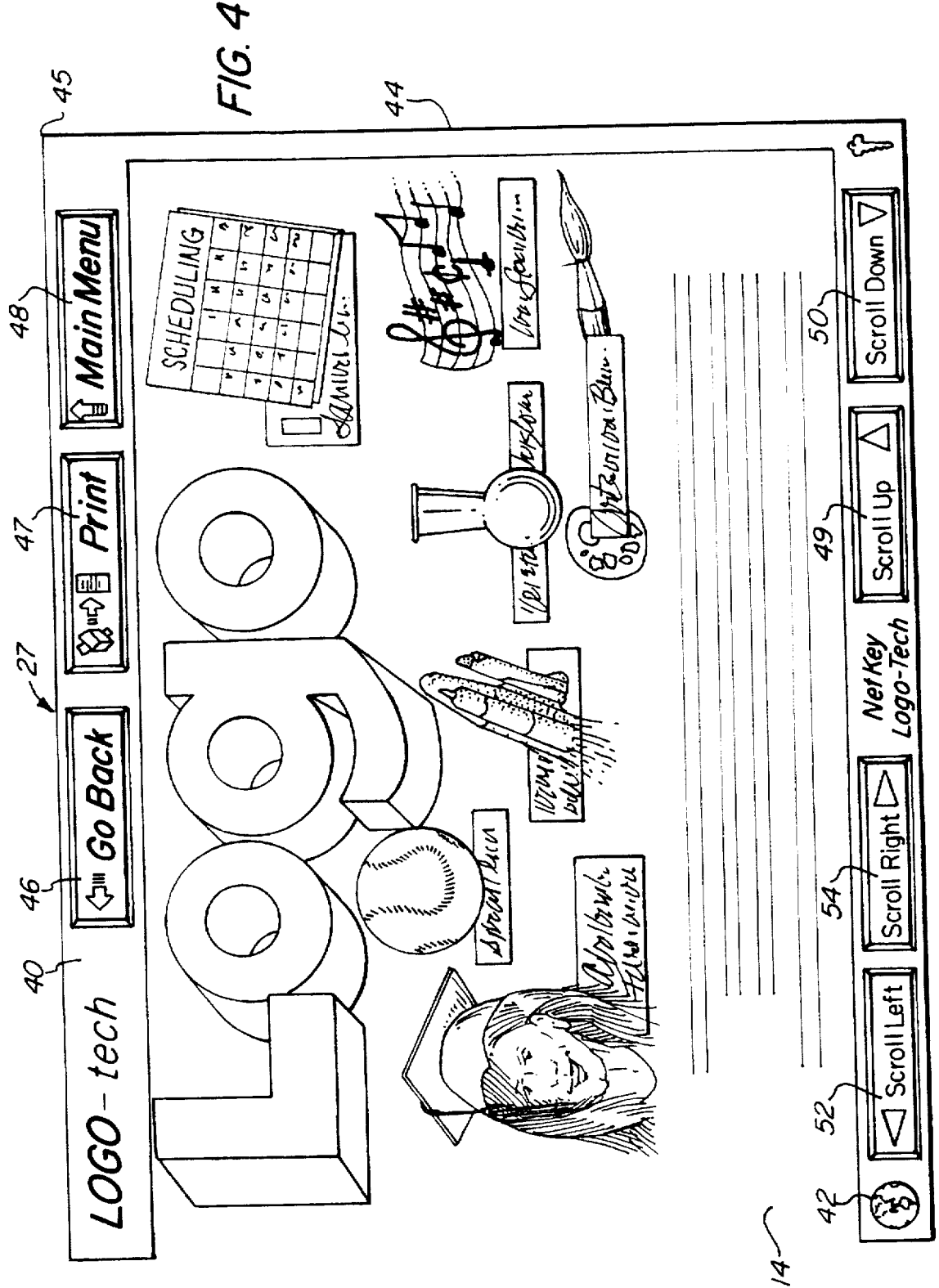
FIG. 4 shows the GUI of FIG. 3 having a first image sized to mask the menu bar and the document title area, a second image sized to mask the status bar and the horizontal scroll bar and a third image sized to mask the vertical scroll bar.

In FIG. 4, the GUI for Netscape Navigator of FIG. 3 or indeed for any other browser has been customized to provide a user-friendly, tamper-resistant environment suitable for the kiosk system 20 of the present invention. FIG. 4 shows the GUI for Netscape Navigator comprising a first image 40 which has been sized to mask the menu bar 2 and the document title area 8, a second image 42 which has been sized to mask the status bar 12 and the horizontal scroll bar 16 and a third image 44 which has been sized to mask the vertical scroll bar 16.

In the embodiment shown, each of these images 40, 42 and 44 is a window overlying the full screen Netscape Navigator window. Each of the overlying windows is created and precisely located with Windows API (application programming interface) function calls. The windows are filled with bitmap images sized to match the corresponding window and stored in memory 32. These overlying windows and bitmap images are created by a GUI control software developed by the inventors which is currently available commercially as NetKey™. It is understood that the same result may be achieved by coding a browser together with the GUI desired for use in a kiosk as a single executable program. This could conveniently be achieved by including browser API calls into the NetKey™ product. It is further understood that in such a product, overlying windows would not need to be used and there would be no need to modify an existing GUI.

Three things should become apparent from FIG. 4. First, the images 40, 42 and 44 are created such that when all three images are selected to be displayed on the touch screen 27, they form a visually pleasing singular frame member, generally indicated by reference numeral 45, around the document viewing area 14. Second, the images, and specifically the first image 40, prevents the user of the browser from accessing any of the menu choices from the menu bar 2. And third, there are button images which appear in the first and second images 40 and 42.

Figure 5:
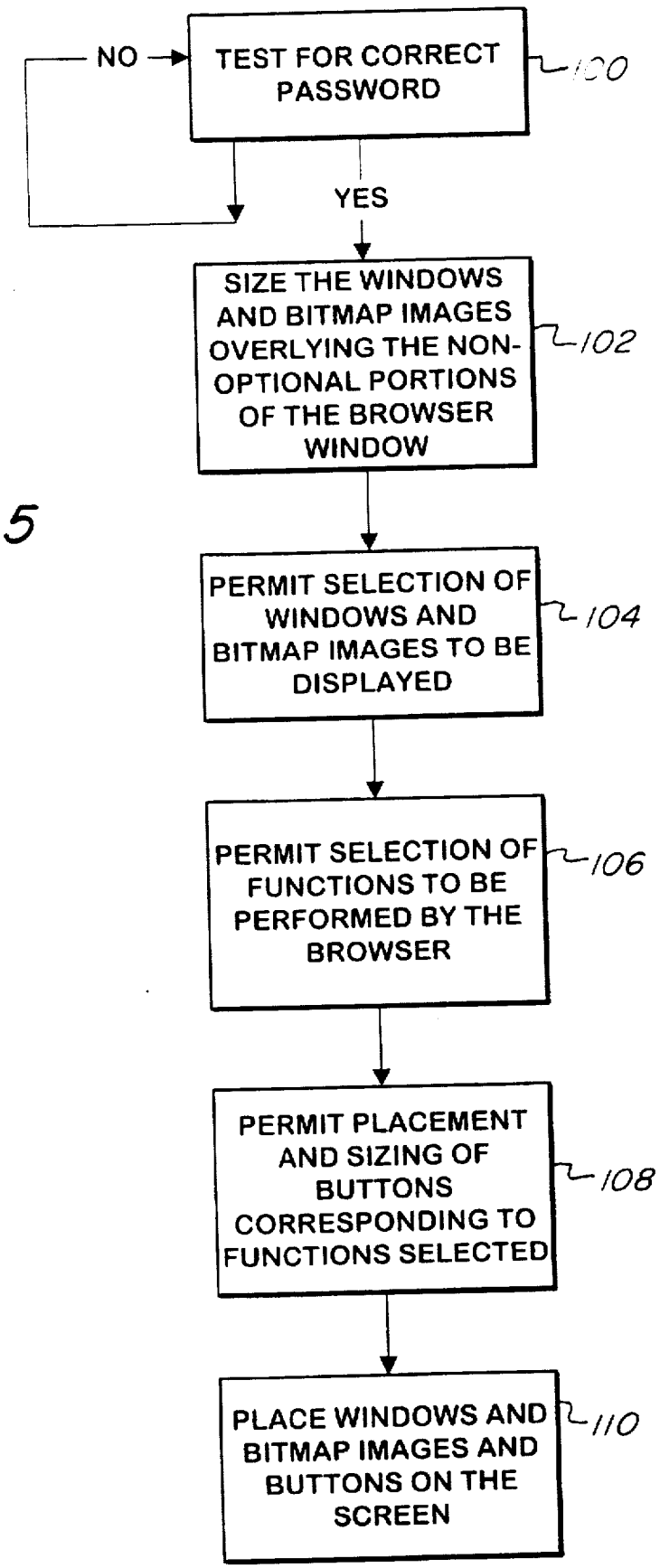
FIG. 5 is a flowchart showing the operation of a GUI control software of the present invention.

The first image 40 has a Go Back button image 46, a Print button image 47 and a Main Menu button image 48. The second image 42 has a Scroll Up button image 49, a Scroll Down button image 50, a Scroll Left button image 52 and a Scroll Right button image 54. As will be described hereinbelow, the selection of these button images, along with the size and placement (on the touch screen 27), are specified by the provider/operator of the kiosk system 20. Furthermore, other than the Main Menu function (which simply returns the system 20 to the main menu page), the function corresponding to each button image is that which can be recognized and performed by the browser, in this case Netscape Navigator. In terms of the operation of these button images on the touch screen 27, there is employed an enhanced mouse driver which permits the microprocessor 30 in conjunction with the touch screen 27 to detect whether the user of the kiosk system 20 has touched one of the button images 46, 47, 48, 49, 50, 52 or 54. Depending upon the button image touched (other than Main Menu 48), the browser is instructed by the GUI control software to perform the corresponding function. Since the operation of the enhanced mouse driver for a touch screen is known in the art, no further description about this will be undertaken herein. The operation of the GUI control software is illustrated in the flowchart of FIG. 5.

In block 100, a test is conducted to see if the correct password has been entered for accessing the GUI control software. This test is conducted by an appropriate daemon, which as known, is a background process which spends most of the time "sleeping" until there is a triggering action that requires the daemon to carry out a specific task. If the correct password has been entered, the GUI control software is then accessed and in block 102, the windows and bitmap images 40, 42 and 44 overlying the non-optional portions of the browser GUI are sized to mask these non-optional portions such that only the document viewing area 14 is not masked.

In block 104, the kiosk system 20 provider/operator is permitted to select the windows and bitmap images 40, 42 and 44 to be displayed on the touch screen 27. The kiosk system 20 provider/operator may choose to display only one, two out of the three, or all three windows and bitmap images. The provider/operator of the kiosk system 20 is further permitted in block 106 to select functions to be performed by the browser. The functions available for selection are each stored in memory 32 as part of a predetermined set of functions capable of being recognized and performed by the browser (can therefore include all the menu choices available from the menu bar 2). For example, for Netscape Navigator, the kiosk system provider/operator may select the Bookmarks function in block 106. Each function selected in block 106 is represented on the touch screen 27 as a button image.

The placement and size of each button on the GUI is left to the kiosk system provider/operator in block 108, the placement and size being specified either by providing bitmap coordinates or by window resizing and dragging techniques familiar to Macintosh and Windows users. Finally, in block 110, the windows and bitmap images selected to be displayed in block 104, as well as the buttons from block 108, are positioned and displayed on the touch screen 27.

Figure 6:
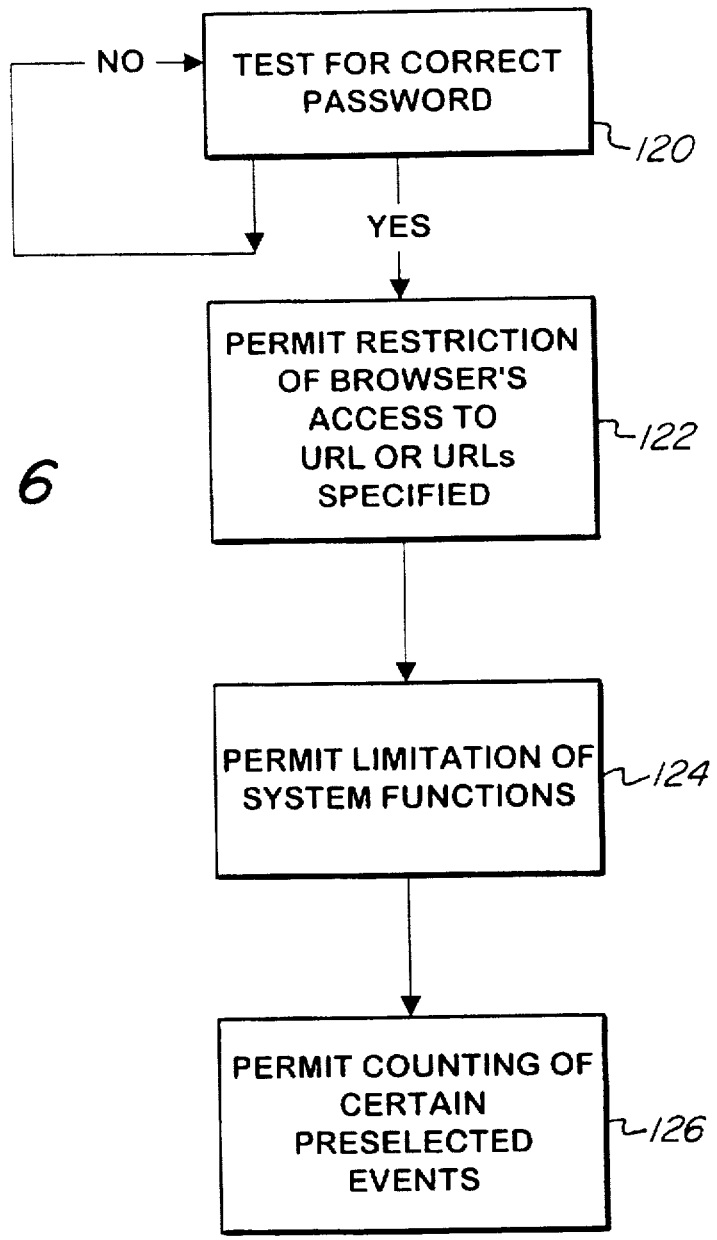
FIG. 6 is a flowchart showing the operation of a security control software of the present invention.

The GUI control software is stored in memory 32. A security control software module may be an enhancement to or a separate program from the GUI control software. The security control software, which is also stored in memory 32, permits the kiosk system 20 provider/operator to limit access of the browser to URLs specified by the provider. Furthermore, in another embodiment of the kiosk system where the keyboard 22 and/or the mouse 24 are provided for use by the kiosk user, the security control software also permits the kiosk system provider/operator to limit the system functions available to the user. The complete operation of the security control software is illustrated in the flowchart of FIG. 6.

In block 120, a test is conducted to see if the correct password has been entered for accessing the security control software. This test is similar to the test conducted by the appropriate daemon in block 100. In fact, if the security control software is part of the GUI control software, then the same password may access both software modules. If the correct password has been entered, the security control software is then accessed and in block 122, the kiosk system 20 provider/operator is given the option of restricting the browser's access to URL or URLs specified by the provider/operator. If the provider/operator of the kiosk system 20 has specified the URLs accessible to the browser, these URLs are stored in memory 32. The browser may be limited to these specified URLs by, for example, listing the URLs under a button for Bookmarks which would correspond to the Bookmarks pull-down menu choice for Netscape Navigator.

In block 124, the provider of the kiosk system is given the option of limiting the operating system functions (e.g., Window resizing) available to the user of the kiosk system. This is done by providing a predetermined set of operating system functions from which the kiosk system provider can select those system functions to be disabled. Finally, in block 126, the kiosk system provider is given the option of counting the occurrence of certain preselected events, such as starting the browser, printing a document, accessing a particular URL, etc. Logging this data may be desired for marketing reasons, gauging the effectiveness of the interactive information provided by the kiosk system 20, or some other reason. The collected data is stored in memory 32.

Once the settings for NetKey™ have been set, then the kiosk system 20 of the present invention is ready for use by the public. The GUI control software settings, the security control software settings and the browser settings of the kiosk system 20 may be remotely modified. For example, if the kiosk system 20 is connected to a Transmission Control Protocol/Internet Protocol or TCP/IP network, remote modification can be performed using file transfer protocol (FTP). FTP server software executing on the microprocessor 30, which may be an additional module of the NetKey™ program, and FTP client software running on a remote computer can be used to transfer files from the remote host over a network to the kiosk system 20. As another example, if kiosk 20 is connected to the Microsoft network, the kiosk hard drive may be shared with an administrator enabling remote updates. In either case, the update is made by closing the executable and replacing it with a new version having different settings and/or by replacing an .ini file or the like associated with the executable to be modified.

A suspend daemon, which may be provided as an enhancement to NetKey™, running in the background shuts down the GUI control software and/or the security control software and/or the browser software when a SUSPEND file is copied to a specified directory on the kiosk system 20. After settings for the GUI control software and/or the security control software and/or the browser software have been modified by copying over the executable with new settings, a restart daemon running in the background starts the modified software when a RESTART file is copied to a specified directory on the kiosk system 20.

Note that an attract loop stored in memory 32 and executable by NetKey™ may be provided to enhance the features of the kiosk system 20. An attract loop is simply a graphic or video which is utilized to draw people to the kiosk system 20 or to keep a user of a kiosk "attracted" to the screen. The appearance of the attract loop on the display screen 27 is preferably controlled by the time-out function, such that when there is no user input for a specified period of time, the attract loop appears on the screen 27.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A self-service computer, comprising:
   a monitor having a display screen;
   a microprocessor coupled to said monitor for controlling what is displayed on said screen;
   browser software executable on said microprocessor for accessing and displaying documents in response to user input, the graphical user interface (GUI) of said browser software comprising controls for said browser software and a document viewing area; and
   at least one image positioned for display on said screen so as to mask the controls for said browser software, said image thus rendering the controls inaccessible to a user of the self-service computer to resist tampering with said browser software.

2. The self-service computer of claim 1, wherein said image includes buttons selectable via said screen for initiating browser software commands.

3. The self-service computer of claim 1, wherein said GUI includes a status area, and further comprising a second image which covers said status area of said GUI of said browser software.

4. The self-service computer of claim 3, wherein said GUI includes a scroll bar, and further comprising a third image wherein said images cover all but the document viewing area of said GUI of said browser software.

5. The self-service computer of claim 1, wherein said browser software is developed by and available from third parties.

6. The self-service computer of claim 1, further comprising GUI control software executable on said microprocessor to generate said image.

7. The self-service computer of claim 6, further comprising file transfer protocol (FTP) server software executable on said microprocessor for remotely updating said GUI control software and/or said browser software.

8. The self-service computer of claim 6, further comprising a first daemon running on said microprocessor which shuts down said GUI control software and/or said browser software when a SUSPEND file is copied to a specified directory on the self-service computer.

9. The self-service computer of claim 8, further comprising a second daemon running on said microprocessor which starts said GUI control software and/or said browser software when a RESTART file is copied to a specified directory on the self-service computer.

10. The self-service computer of claim 1, further comprising a security control software executable on said microprocessor, said security control software being programmed to limit documents accessible to said browser software by limiting uniform resource locators (URLs) accessible to said browser software.

11. The self-service computer of claim 10, wherein said security control software is further programmed to disable system functions available to the user of the self-service computer.

12. The self-service computer of claim 1, wherein the access of said browser software includes the world wide web (WWW).

13. The self-service computer of claim 1, further comprising an attract loop which appears on said display screen when there has been no user input for a predetermined period of time.

14. A self-service kiosk system, comprising:
   a monitor having a display screen;
   a microprocessor coupled to said monitor for controlling what is displayed on said screen;
   browser software module executable on said microprocessor for accessing and displaying documents in response to user input; and
   security control software module executable on said microprocessor, said security control software module being programmed to disable system functions available to a user of the kiosk system to resist tampering with the kiosk system during operation of the kiosk system.

15. The self-service kiosk system of claim 14, wherein said security control software module is further programmed to limit documents accessible to said browser software module by limiting uniform resource locators (URLs) accessible to said browser software module.

16. A self-service computer, which comprises:
   a monitor having a display screen;
   a keyboard and a mouse;
   a microprocessor electrically coupled to said monitor for controlling what is displayed on said screen;
   software including browser application programming interface (API) calls executable on said microprocessor for accessing and displaying documents in response to user input, the graphical user interface (GUI) of said software displaying only the document viewing area; and
   security control software executable on said microprocessor, said security control software being programmed to disable system functions available to a user of the self-service computer to resist tampering with the self-service computer during operation of the self-service computer.

17. A method for providing a self-service computer, comprising the steps of:

providing a monitor with a display screen;

providing browser software for accessing and displaying documents in response to user input, the graphical user interface (GUI) of said browser software comprising controls for said browser software and a document viewing area; and masking the controls for said browser software with at least one image so that the controls are inaccessible to a user of the self-service computer.

18. The method of claim 17, wherein said image includes buttons selectable via said screen for initiating browser software commands.

19. The method of claim 17, further comprising the step of masking said GUI of said browser software so that only the document viewing area is not covered.

20. The method of claim 17, further comprising the step of limiting documents accessible to said browser software by limiting uniform resource locators (URLs) accessible to said browser software.

21. The method of claim 17, further comprising the step of updating said browser software remotely.

22. A method for providing a self-service kiosk system, comprising the steps of:

providing a monitor with a display screen;

providing browser software for accessing and displaying documents in response to user input; and disabling system functions available to a user of the kiosk system to resist tampering with the kiosk system during operation of the kiosk system.

* * * * *